United States Patent
Fersman et al.

(10) Patent No.: US 7,899,058 B2
(45) Date of Patent: Mar. 1, 2011

(54) USING A HASH VALUE AS A POINTER TO AN APPLICATION CLASS IN A COMMUNICATIONS DEVICE

(75) Inventors: Elena Fersman, Sandgropsgatan (SE); Göran Eriksson, Gubboda (SE); Leonid Mokrushin, Murargalan (SE)

(73) Assignee: Telefonaktiebolaget L M Ericsson (publ), Stockholm (SE)

( * ) Notice: Subject to any disclaimer, the term of this patent is extended or adjusted under 35 U.S.C. 154(b) by 574 days.

(21) Appl. No.: 12/046,559

(22) Filed: Mar. 12, 2008

(65) Prior Publication Data
US 2009/0232141 A1 Sep. 17, 2009

(51) Int. Cl.
*H04L 12/56* (2006.01)
(52) U.S. Cl. .................... 370/395.1; 713/167
(58) Field of Classification Search ............... 709/227, 709/226; 719/328; 379/88.01; 370/325, 370/329
See application file for complete search history.

(56) References Cited

U.S. PATENT DOCUMENTS

| | | | |
|---|---|---|---|
| 6,928,054 B1* | 8/2005 | Montuno et al. ............. 370/235 |
| 2004/0186918 A1 | 9/2004 | Lonnfors et al. |
| 2006/0020950 A1* | 1/2006 | Ladd et al. ................. 719/328 |
| 2006/0259623 A1* | 11/2006 | Crawford et al. ........... 709/226 |
| 2008/0008297 A1* | 1/2008 | Gurfein et al. ............. 379/88.01 |
| 2008/0019307 A1* | 1/2008 | Tenny et al. ................ 370/329 |
| 2008/0214309 A1* | 9/2008 | Gatto et al. ................... 463/42 |
| 2008/0215883 A1* | 9/2008 | Fok et al. ..................... 713/167 |
| 2008/0272880 A1* | 11/2008 | Sutardja et al. .............. 340/5.2 |
| 2008/0320148 A1* | 12/2008 | Capuozzo et al. ........... 709/227 |

FOREIGN PATENT DOCUMENTS

| | | |
|---|---|---|
| EP | 1 770 942 A1 | 4/2007 |
| WO | 2006 125471 A1 | 11/2006 |

OTHER PUBLICATIONS

Corrected International Search Report mailed Jan. 18, 2010 for PCT/SE2009/050175 originally mailed Jun. 15, 2009.
Corrected Written Opinion mailed Jan. 18, 2010 for PCT/SE2009/050175 originally mailed Jun. 15, 2009.
3GPP TS 23.228 V7.10.0 (Dec. 2007), "3rd Generation Partnership Project; Technical Specification Group Services and System Aspects; IP Multimedia Subsystem (IMS); Stage 2 (Release 7)," 3GPP, p. 44.
3GPP TS 24.228 V5.15.0 (Sep. 2006), "3rd Generation Partnership Project; Technical Specification Group Core Network and Terminals; Signalling flows for the IP multimedia call control based on Session Initiation Protocol (SIP) and Session Description Protocol (SDP); Stage 3 (Release 5)," 3GPP, pp. 32-49, 393-404.
International Search Report for PCT/SE2009/050175 mailed Jun. 15, 2009.
Written Opinion for PCT/SE2009/050175 mailed Jun. 15, 2009.
Olsson, U., et al., "Communication Services—The Key to IMS Service Growth," Ericsson Review No. 1, Jan. 22, 2008, pp. 8-13.

* cited by examiner

*Primary Examiner* — Thong H Vu
(74) *Attorney, Agent, or Firm* — Potomac Patent Group PLLC

(57) ABSTRACT

Systems and methods according to the present invention provide techniques for improving the efficiency of routing for requests in devices, e.g., mobile devices.

24 Claims, 10 Drawing Sheets

SIP/2.0
200 OK
From: User B<sip:UEB@sample.com>;tag=123456
To: UserA<sip:UEA@sample.com>;tag=654321
Call-ID: 410 465 6413@sample.com
CSeq: 1 INVITE
Contact:<sip:UserA@20.21.30.31>
402 — Content-Type: application/sdp
Content-Length: 200

FIG. 4A

SIP/2.0
200 OK
From: User B<sip:UEB@sample.com>;tag=123456
To: UserA<sip:UEA@sample.com>;tag=654321
Call-ID: 410 465 6413@sample.com
CSeq: 1 INVITE
Contact:<sip:UserA@20.21.30.31>
402 — Content-Type: application/sdp; AppID=hashvalue — 410
Content-Length: 200

FIG. 4B

USING A HASH VALUE AS A POINTER TO AN APPLICATION CLASS IN A COMMUNICATIONS DEVICE

TECHNICAL FIELD

The present invention relates generally to telecommunications systems and in particular to methods and systems for allowing mobile clients to more directly address an application class to reduce dispatching time.

BACKGROUND

Communications technologies and uses have greatly changed over the last few decades. In the fairly recent past, copper wire technologies were the primary mechanism used for transmitting voice communications over long distances. As computers were introduced, the desire to exchange data between remote sites became desirable for many purposes such as those of businesses, individual users and educational institutions. The introduction of cable television provided additional options for increasing communications and data delivery from businesses to the public. As technology continued to move forward, digital subscriber line (DSL) transmission equipment was introduced which allowed for faster data transmissions over the existing copper phone wire infrastructure. Additionally, two way exchanges of information over the cable infrastructure became available to businesses and the public. These advances have promoted growth in service options available for users.

As the consumer electronics industry continues to mature, and the capabilities of processors increase, more devices have become available for public use that allow for the transfer of data between devices and more classes have become available that operate based on this transferred data. Of particular note are the Internet and local area networks (LANs). These two innovations allow multiple users and multiple devices to communicate and exchange data between different devices and device types. Regarding the Internet, its physical structure and associated communication streams have also evolved to handle an increased flow of data. Servers have more memory than ever before, communications links exist that have a higher bandwidth than in the past, processors are faster and more capable and protocols exist to take advantage of these elements. As consumers' usage of the Internet grows, service companies have turned to the Internet (and other Internet Protocol (IP) networks) as a mechanism for providing traditional services. These multimedia services include Internet Protocol television (IPTV, referring to systems or services that deliver television programs over a network using IP data packets), video on demand (VOD), voice over IP (VoIP), and other web related services received singly or bundled together. Similar comments apply to cellular networks which can also handle communications with devices through the Internet or other connected networks.

To accommodate the new and different ways in which IP networks are being used to provide various services, new network architectures are being developed and standardized. One such development is the Internet Protocol Multimedia Subsytem (IMS). IMS is an architectural framework for delivering IP multimedia services, such as IPTV, to an end user. The IMS architecture used in an IMS system 10 can be broken down into three layers, as shown in FIG. 1: (1) a service layer 12; (2) a control layer 14; and (3) a connectivity layer 16. The service layer 12 includes class servers (ASs) 18, 20 which contain services and applications that can be delivered to an end user, e.g., IPTV services. The control layer 14 includes a home subscriber server (HSS) 22, a media resource function (MRF) 24, a call service control function (CSCF) 26, a signaling gateway/media gateway control function (SG/MGCF) 28 and a media gateway 30. These elements in the control layer 14 are typically used for managing session setup, resource modification and release of resources. The connectivity layer 16 includes routers and switches used in both the backbone network and the access network. These elements are shown in FIG. 1 by Internet Protocol (IP)/multi-protocol label switching (MPLS) 32, the public switched telephone network (PSTN)/public land mobile network (PLMN) 34 and media gateway 30. This connectivity layer 16 is used to connect various end user devices to either each other or a variety of services and applications. Some types of end user devices are, for example, personal computers and mobile phones. It will be appreciated by those skilled in the art that more or fewer elements can exist in an IMS architecture.

Session Initiation Protocol (SIP) signaling is often used for setting up, modifying and terminating sessions between two devices. For example SIP signaling could be used between mobile devices to set up a session or used between a mobile device and an application server associated with IMS for receiving a multimedia service on the mobile device. As interest in IMS grows, the quantity of IMS enabled applications being developed for end user devices, e.g., mobile phones, is increasing. This, in turn, leads to the desire to create efficient SIP addressing methods. Currently, an incoming SIP request to access an application available in a mobile terminal is routed in that mobile terminal to a certain application class depending on the parameters, e.g., SIP headers and parameters, used in the incoming SIP request.

For example, a current method for handling initial SIP application requests received by a mobile device will now be described with respect to FIG. 2. FIG. 2 shows a mobile device 200 in communications with an IMS network 202 and an external entity 204. External entity 204 can be a network entity such as a login entity or an authentication server or the like. Mobile device 200 includes a SIP support layer 206, an application dispatcher 208, a number of deployed applications 210 and an application dispatching manager (ADM) 212. Initially, a SIP application request is received by mobile device 200 from the IMS network 202 at the SIP support layer 206. The SIP support layer 206 forwards the SIP request to the application dispatcher 208. The application dispatcher 208 sends the SIP request to the ADM 212. The ADM 212 then reviews the SIP request and attempts to make a decision regarding which application class is to be the handler for the incoming SIP request. The ADM 212 makes this decision based upon a variety of factors, such as, the request parameters, security aspects and terminal capabilities. If the ADM 212 is unable to decide which application class is to be the handler for the incoming SIP request, the ADM 212 can send a request to an external entity 204 for guidance. If the ADM 212 is able to make the determination itself, then the SIP request is sent back to the application dispatcher 208 for appropriate dispatching. This process may include an authentication procedure or a request to an external entity 204 which can be both time and resource consuming.

After this initial application request processing between the two mobile clients, it may be desirable for subsequent SIP application request processing between these two clients to reflect the knowledge acquired during the initial handshaking. For example, after dialog establishment, the mobile clients involved in the communication may be aware of which application classes, e.g., available application classes such as chess and VoIP, are being used on both mobile devices associated with the SIP request. One of the mobile clients may then, for example, want to address the same class by, e.g., sending a SIP MESSAGE outside of the current SIP dialog. Alternatively, one mobile client may choose to end and then re-establish the dialog between with that other mobile client using the same class that was used before. In at least these cases, there should be no need to perform the time and resource consuming routing procedure described above for choosing the application class to use, since the same class should be used as was used during the previous dialog between these two mobile entities.

However, there is currently no mechanism in place that allows mobile clients to avoid the long dispatching procedure when wishing to repeat a session using the same class between two devices. Accordingly exemplary embodiments described below address the need for improving the efficiency of routing for application requests in devices, e.g., mobile devices.

SUMMARY

Systems and methods according to the present invention address this need and others by providing techniques for improving the efficiency of routing for requests in devices, e.g., mobile devices.

According to one exemplary embodiment a method for a first communication device to access an application class which is available on a second communication includes: transmitting by the first communication device a request message, wherein the request message includes a request for the application class; receiving by the first communication device an acknowledgement message, wherein the acknowledgement message includes a hash value associated with the application class; storing by the first communication device the hash value associated with the application class; terminating the application class on the first communication device; and transmitting by the first communication device a second request message, wherein the second request message includes the hash value.

According to another exemplary embodiment a method for handling an access request to an application class in a communication device including: receiving a first request message, wherein the request message includes a request for access to the application class; determining, dispatching instructions indicating how to route the request for the application class to the application class; creating a hash value associated with the application class; transmitting an acknowledgement message, wherein the acknowledgment message includes the hash value associated with the application class; receiving a second request message, wherein the second request message includes the hash value; and using the dispatching instructions associated with the hash value for the application class.

According to yet another exemplary embodiment a communication device including: a communications interface for receiving a first request message and transmitting an acknowledgement message, wherein the first request message includes a request for access to an application class; a processor for dispatching instructions indicating how to route the request for access to the application class and wherein the processor creates a hash value associated with the application class; and memory for storing the hash value associated with the application class.

According to yet another exemplary embodiment a computer readable medium containing instructions, when executed on a processor, perform the steps of: transmitting by the first communication device a request message, wherein the request message includes a request for the application class; receiving by the first communication device an acknowledgement message, wherein the acknowledgement message includes a hash value associated with the application class; storing by the first communication device the hash value associated with the application class; terminating the application class on the first communication device; and transmitting by the first communication device a second request message, wherein the second request message includes the hash value.

According to yet another exemplary embodiment a computer readable medium containing instructions, when executed on a processor, perform the steps of: receiving a first request message, wherein the request message includes a request for access to the application class; determining, dispatching instructions indicating how to route the request for the application class to the application class; creating a hash value associated with the application class; transmitting an acknowledgement message, wherein the acknowledgment message includes the hash value associated with the application class; receiving a second request message, wherein the second request message includes the hash value; and using the dispatching instructions associated with the hash value for the application class.

BRIEF DESCRIPTION OF THE DRAWINGS

The accompanying drawings illustrate exemplary embodiments, wherein:

FIG. 4(a) shows an example of a 200 OK message;

FIG. 4(b) shows an example of a 200 OK message according to exemplary embodiments;

DETAILED DESCRIPTION

The following detailed description of the exemplary embodiments refers to the accompanying drawings. The same reference numbers in different drawings identify the same or similar elements. Also, the following detailed description does not limit the invention. Instead, the scope of the invention is defined by the appended claims.

Figure 3:
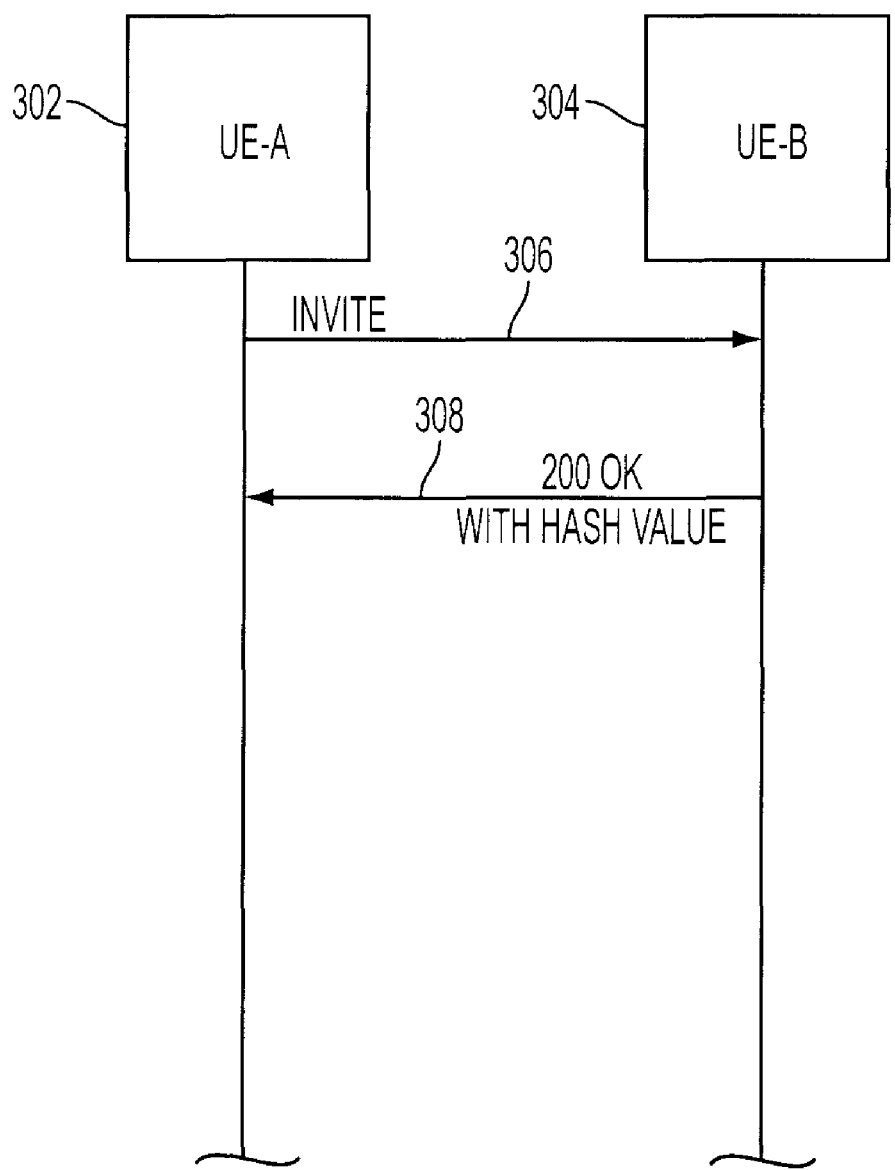
FIG. 3 shows a signaling diagram for user equipment communications according to exemplary embodiments.

As described above, when receiving a session initiation protocol (SIP) message at a device, e.g., a mobile device, for setting up a session involving an application class available at that mobile device, it is desirable to shorten the dispatching process for repeat sessions using the same application class. A high level description of an exemplary embodiment will now be described with respect to FIG. 3. In this example, two mobile clients, user equipment (UE)-A 302 and UE-B 304, are in communications with each other through a network (not shown). UE-A 302 sends a SIP INVITE message 306 to UE-B 304. The SIP INVITE message 306 includes a request for a specific application class to access. The term "application class", as used in this specification, refers to the type of content that an application is capable of handling or the format of the messages that two applications of the same application class exchange, e.g., "image/jpg" or "application/chess". Additionally, an application class can have different access levels, e.g., private and public, which contain different information. For example, the application class "Chess" can have a publicly known name of chess which is generally known to be associated with the application class Chess and can be used in SIP requests. A device which is capable of running a specific application of the application class Chess will also have a private descriptor contained in its private access level associated with the application class Chess used for creating instances of the specific application chess. Due to security reasons, the private class name, or private descriptor contained in the private access level, is not typically transferred between the mobile clients.

Therefore, the device that receives the SIP INVITE message 306, i.e., UE-B 304, generates a hash value associated with the received request. This hash value is generated using, as an input to a hashing algorithm, the private application class name corresponding to the public class name provided in the SIP request. The hash value may, optionally, be generated using one or more additional inputs, such as, SIP dialog identification, application class layer security, e.g., user authentication, terminal capabilities and the like. A hashing mechanism can be provided within the UEs to create this hash value. For example, one exemplary hashing algorithm that can be used is the Message Digest 5 (MD5) algorithm by taking the ASCII character wise MD5 sum of the Java class name string, e.g., MD5("com.ericsson.chess.ChessGame")= 181060a4f26747878beddc604a083c0b. Once the hash value is generated by UE-B 304, in this example, the hash value is transmitted back to UE-A 302 as part of 200 OK message 308, as well as other information associated with the request, and as generated by the dispatching procedure. This hash value associated with the application class requested by UE-A 302 is stored by UE-A 302 for future use.

Dispatching in a mobile device 200 is typically performed by an application dispatching manager (ADM) 212. More specifically, the ADM 212 decides how originating and terminating requests are dispatched. As described above, having to repeatedly go through the potentially lengthy dispatching routine performed by ADM 212 can be both time and resource consuming. According to exemplary embodiments, the hash value which is created, as described above in conjunction with an initial application class request, is associated with a received request and stored for future use, so that it can later be transmitted back to the mobile device which generated the hash value as a token. Thus, when the hash value is received in future messages, the mobile device 200 which generated that hash value has the option to shorten the dispatching function and directly route the request to the appropriate application class. Typically, the application dispatcher 208 will see the received hash value and, based upon previously received instructions from the ADM 212, forward the request directly to the desired application class. The hash value is a globally unique string and is typically stored on both terminals (or it can be calculated on-the-fly in the mobile terminal which originated the hash value).

According to exemplary embodiments, the hash value can be transmitted in SIP messages by using a new parameter called "AppID" for the Content-Type header to pass the hash value. One example of a SIP message that contains a Content-Type header is a 200 OK message. An illustrative example of a 200 OK message is shown in FIG. 4(a). Of particular interest in FIG. 4(a) is line 402 which shows the Content-Type header which contains the information "application/sdp". According to exemplary embodiments, the Content-Type header in line 402 can be modified as shown in FIG. 4(b) to include a hash value. More specifically, as shown in line 402 of FIG. 4(b), a new parameter AppID=hashvalue 410 has been added to carry the hash value associated with a specific class. More information regarding SIP and the Content-Type header in general can be found at www.ietf.org in rfc3261 dated June 2002 which is incorporated herein by reference.

Figure 5:
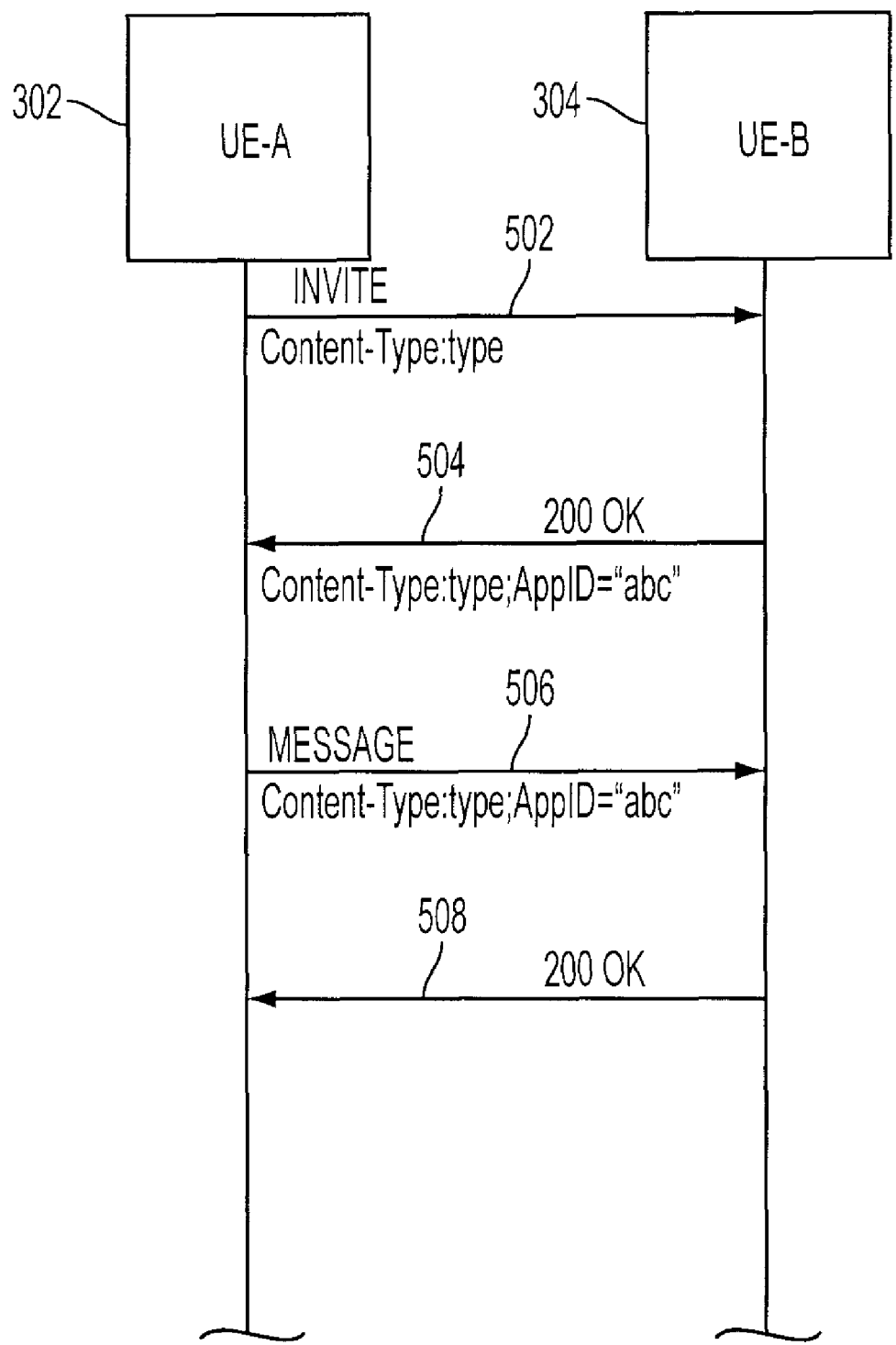
FIG. 5 shows a signaling diagram for user equipment communications attempting repeat sessions using the same hash value according to exemplary embodiments.

According to an exemplary embodiment a hash value associated with a specific class name can be generated and transmitted between UEs as shown in FIG. 5. Initially, UE-A 302 sends a SIP INVITE message 502 requesting a certain application class to UE-B 304. Taking the request for a chess application as a purely illustrative example, the application class information provided in the SIP INVITE message 502 can, for example, be formatted as a "Content-Type: application/chess" header in the INVITE message. Alternatively, some other mechanism for transferring the "application/chess" string in the body of the INVITE message could be used, the exact formatting of which can depend on the mime type (content type) of the message body itself. UE-B 304 generates the hash value "abc" which corresponds to a specific application class name. This hash value is stored in UE-B 304. A 200 OK message 504, which includes in the Content-Type header the "AppID=abc" parameter, is transmitted from UE-B 304 to UE-A 302. UE-A 302 stores this hash value, and communications continue between the two UEs for the duration of the session. At some future point in time, UE-A 302 sends a MESSAGE 506 to UE-B 304 which is addressed to the same application class used previously, which includes in the Content-Type header the "AppID=abc" parameter. UE-B 304 retrieves the application class name associated with the hash value "abc" and transfers the SIP MESSAGE 506 directly to the application class, skipping the standard dispatching procedure.

Figure 6:
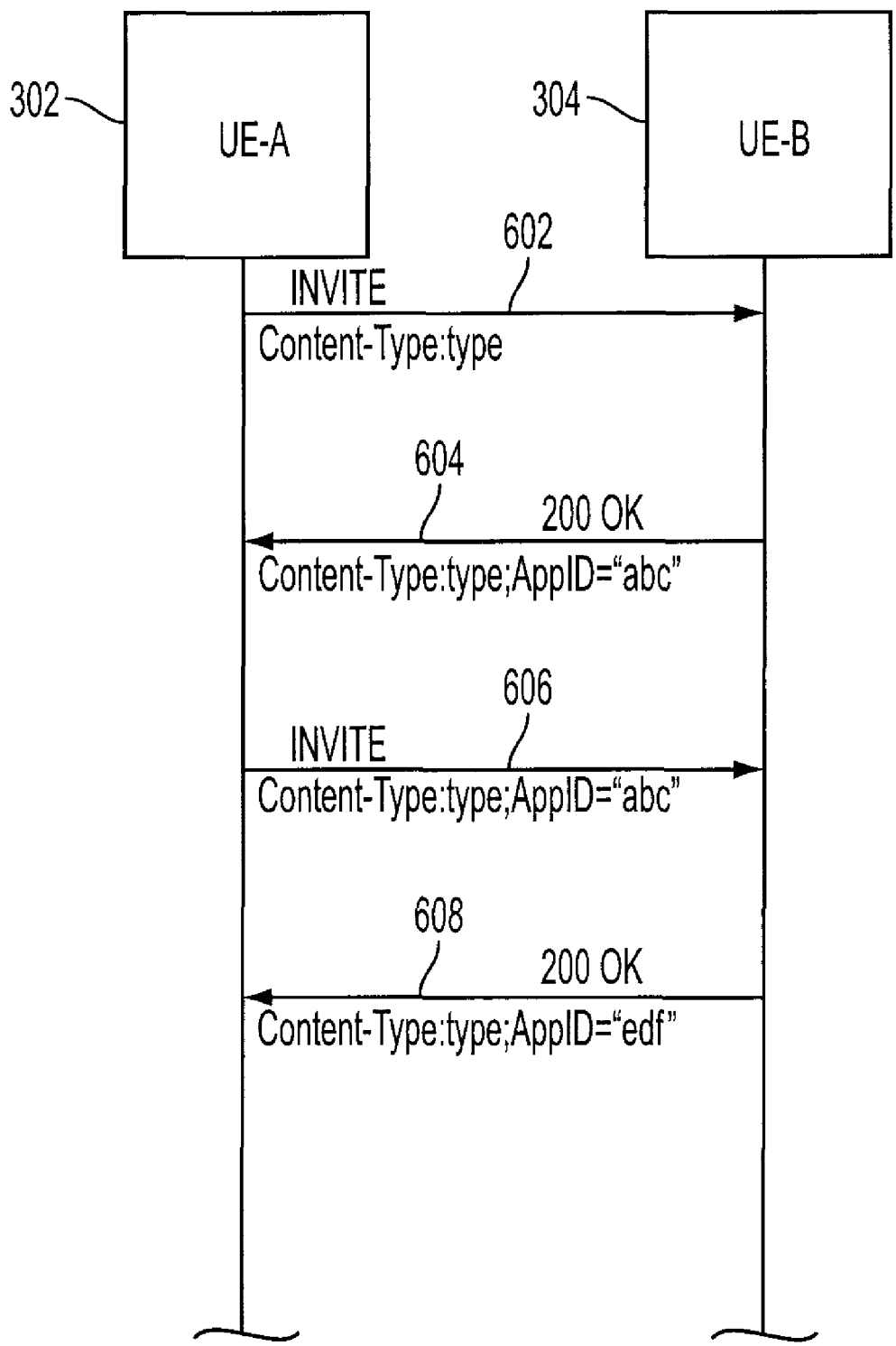
FIG. 6 depicts a signaling diagram for user equipment communications attempting repeat sessions needing a different hash value according to exemplary embodiments.

As described above, according to exemplary embodiments a hash value can be associated with a class. This hash value can be used repeatedly by the mobile devices that have stored this hash value to skip parts of the dispatching process to access the associated class. However, in some cases, an application class can be updated between sessions, deleted or the like. According to exemplary embodiments a new hash value can be created and transmitted to a requesting mobile device when a requested class is not found as shown in the signaling diagram of FIG. 6, which will now be described.

Initially a SIP INVITE message 602 is transmitted from UE-A 302 to UE-B 304. A standard dispatching routine is followed and a hash value "abc" is created associated with the specified application class name. A 200 OK message 604 is sent back to UE-A 302 which includes in the Content-Type header the "AppID=abc" parameter. This hash value is also stored on UE-A 302. At some future point in time, e.g., after the current session has ended between the two mobile devices, UE-A 302 transmits another SIP INVITE message 606 which includes in the Content-Type header the "AppID=abc" parameter. to UE-B 304. UE-B 304 does not find, for whatever reason, the class that is associated with hash value "abc" and therefore follows a standard dispatching routine. Additionally, UE-B 304 generates a new hash value "edf" associated with the chosen application class. UE-B 304 then transmits a 200 OK message 608 so that the session can begin with the desired application class and the 200 OK message 608 also includes in the Content-Type header the "AppID=edf" parameter. Upon receipt of 200 OK message 608, UE-A 302 detects that the hash value has changed associated with the desired application class and replaces the old hash value, i.e., "abc", with the new hash value, i.e., "edf". Thus, if EU-A 302 wishes in the future to begin a new session with the same application class, it will have the correct hash value to do so, unless the desired class stored on UE-B 304 has been updated again.

Figure 7:
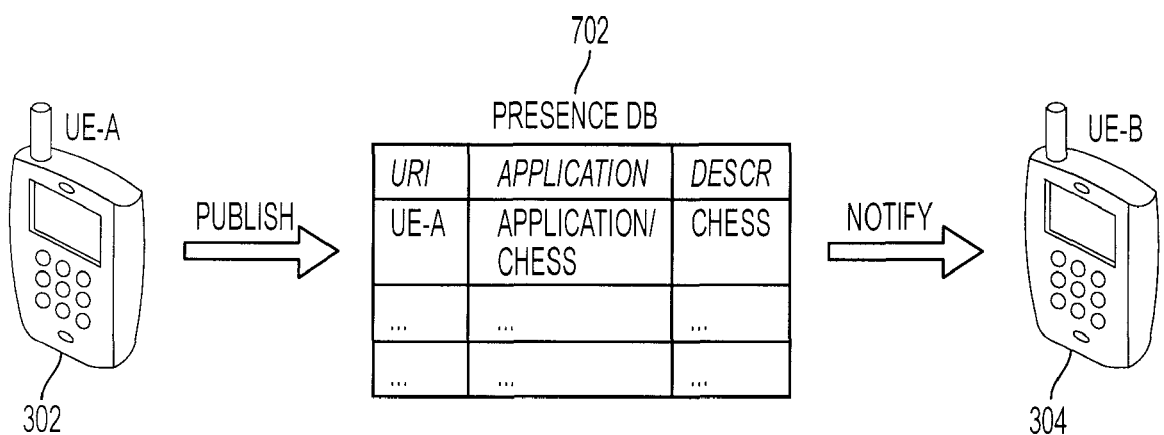
FIG. 7 shows two communication devices in communications with a presence server according to exemplary embodiments.

With the many types of content available going through a plurality of networks and nodes, it is to be understood that many methods for notifying devices which application classes a device can offer exists and will vary over time and with different devices. According to exemplary embodiments, one method for disseminating which application classes a mobile device is capable or desiring to run involves the use of a presence server as will now be described using FIG. 7. As previously described above, an application class can include different access levels such as private and public which contain different information. For security reasons, information in the private access level is not typically made publicly available and would not be posted on presence server 702. Therefore, UE-B 304 decides to publish on presence server 702, or presence database, that UE-B 304 can host the application class Chess by having the presence server 702 post information from UE-B's 304 public access level of Chess describing the application class Chess, e.g., the word chess. This information is then available to other mobile devices. In this example, presence server 702 sends a message notifying UE-A 302 that UE-B 304 is available/capable of hosting chess. If UE-B 304 was interested in accessing a chess application, then the exemplary SIP signaling process described above with respect to FIGS. 5 and 6 could be used with UEB 304 using the public application class name "chess" which it obtained from the presence server 702 in the request.

According to other exemplary embodiments, a hash value may be generated associated with a specific application class and used in conjunction with additional security measures, e.g., generated security tokens distributed to authorized users, for increasing the level of security in communications for accessing an application class on a mobile device. For example, assume that UE-B 304 has posted on a presence server 702 its ability and desire to host the class chess. UE-A 302 responds with a request to use the application class chess. Additionally, the message from UE-A 302 includes a security token that is recognized by UE-B 304. UE-304 B responds with a 200 OK message, as described above, with a hash value associated with chess as well as the necessary information to access chess. A separate UE-C sends a request message to UE-B 304, requesting access to chess. UE-B 304 recognizes that UE-C's request lacks a recognized security token as well as the hash value associated with chess. Therefore, UE-B 304 denies UE-C's request.

According to another exemplary embodiment, the ADM 212 can provide instructions to the application dispatcher 208 regarding how to respond to various received requests. As described above, the application dispatcher 208 can route new requests to the ADM 212, or if a hash value has been received the application dispatcher 208 can route the request directly to the appropriate application class. Additionally, other routing instructions can be provided by the ADM 212 to the application dispatcher 208. For example, different security options can be programmed to have different responses with respect to dispatching. More specifically, a security option could require that all requests go to the ADM 212 for routing, or that any request with a received hash value can be forwarded directly to the appropriate application class. Alternatively, an external entity 204, e.g., an authentication server, can be used as desired to authenticate incoming requests.

Figure 8:
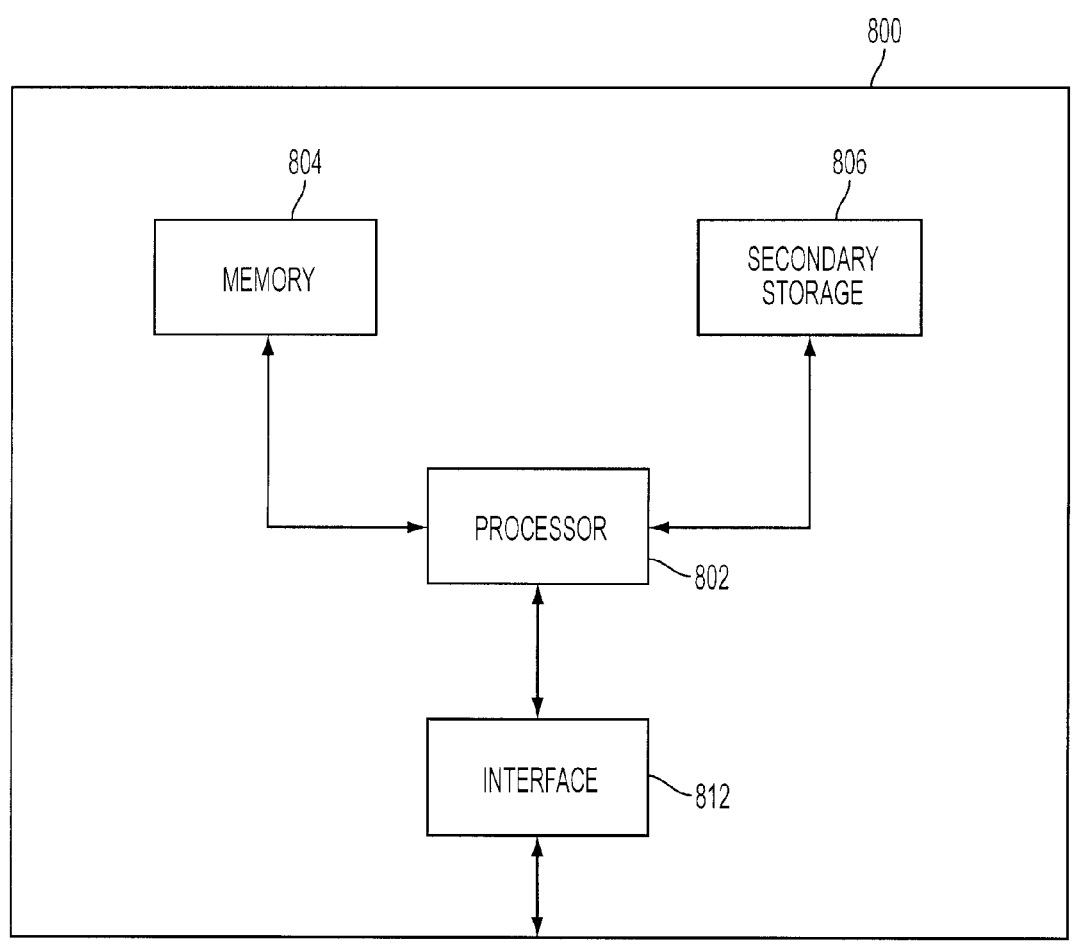
FIG. 8 depicts a communications node according to exemplary embodiments.

The exemplary embodiments described above, illustrate methods for exchanging messages that use are associated with using a hash value as a pointer to an application class on end user devices. An exemplary communications node 800, capable of creating and storing a hash value (or acting as a pass through node for forwarding communications), will now be described with respect to FIG. 8. Communications node 800 can contain a processor 802 (or multiple processor cores), memory 804, one or more secondary storage devices 806 and an interface unit 808 to facilitate communications between communications node 800 and the rest of the network. The memory can be used for storage of exemplary items described above such hash values and application classes, e.g., "image/jpg" or "application/chess". Additionally, the processor 802 (or multiple processor cores) in communications node 800 can perform the functions of an ADM 212 and an application dispatcher 208 for dispatching requests to the desired classes, as well as running the instructions for the desired classes. Thus, a communications node (or user device) according to an exemplary embodiment may include a processor and memory for receiving requests, generating and storing hash values associated with specific classes and routing repeat requests directly to the desired application class when the request is accompanied by a valid hash value.

Figure 1:
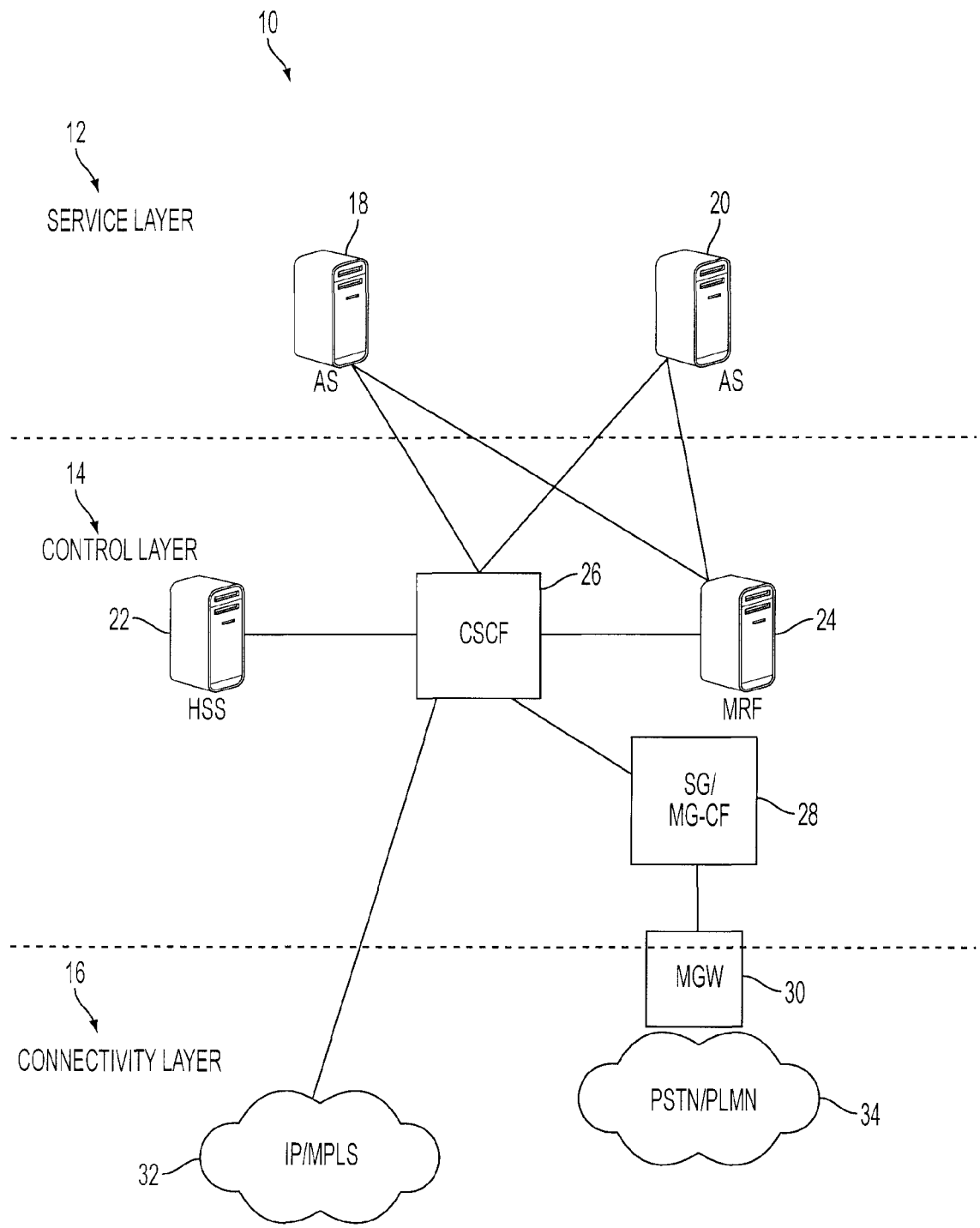
FIG. 1 shows an Internet Protocol Multimedia Subsystem (IMS) architecture according to exemplary embodiments.
Figure 2:
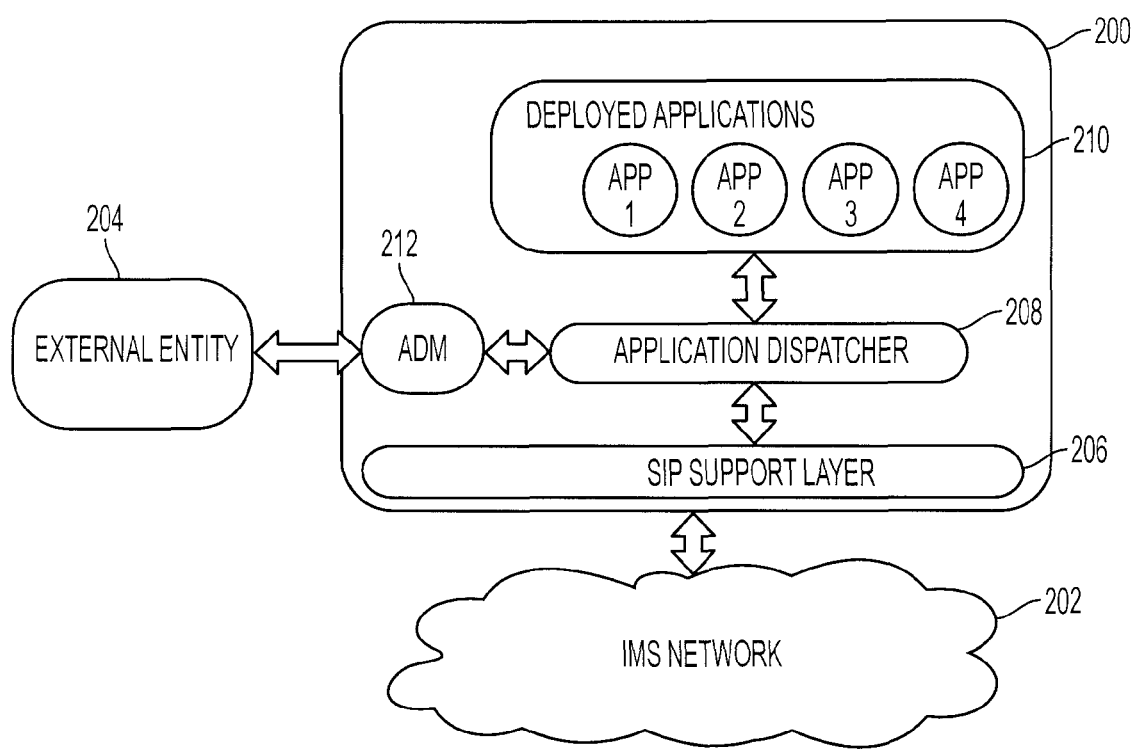
FIG. 2 illustrates a mobile device in communications with an IMS network and an external entity according to exemplary embodiments.

Using the above described exemplary systems and methods, an example of efficient routing in a mobile device will now be described using FIG. 2. According to exemplary embodiments, a mobile device 200 receives a SIP message which includes a request to play chess and a hash value of "xyz". Application dispatcher 208 has previously received instructions from ADM 212 for allowing any request with a valid hash to be directly forwarded to the desired application class for processing. Application dispatcher 208 searches in memory for hash value "xyz" and matches the received hash value "xyz" to the application class chess. Application dispatcher 208 then forwards the request directly to the class chess for processing, thus bypassing ADM 212 which reduces processing time and resource usage. Mobile device 200 then sends a 200 OK back to the originator of the request.

Figure 9:
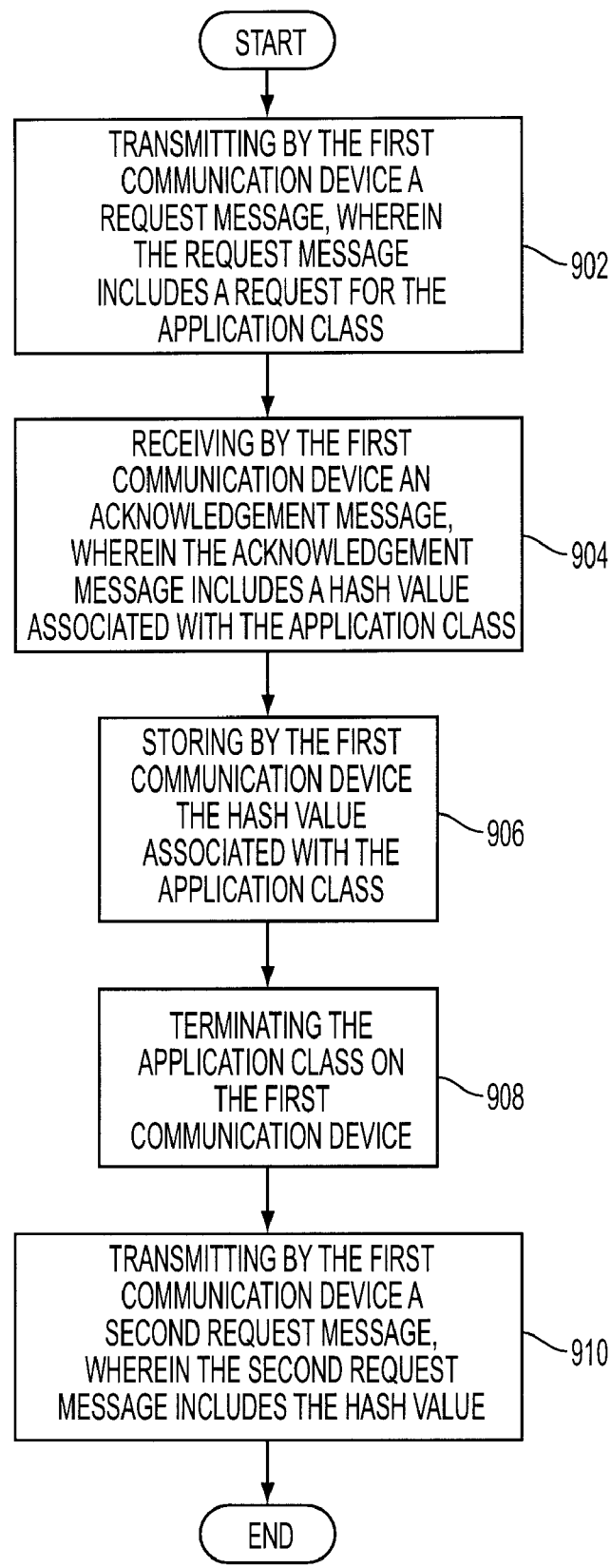
FIG. 9 shows a method flowchart for handling an access request to an application class in a communication device according to exemplary embodiments.

Utilizing the above-described exemplary systems according to exemplary embodiments, a method for acquiring IP addresses for devices in a network is shown in the flowchart of FIG. 9. Initially a method for a first communication device to access an application class which is available on a second communication includes: transmitting by the first communication device a request message, wherein the request message includes a request for the application class in step 902; receiving by the first communication device an acknowledgement message, wherein the acknowledgement message includes a hash value associated with the application class in step 904; storing by the first communication device the hash value associated with the application class in step 906; terminating the application class on the first communication device in step 908; and transmitting by the first communication device a second request message, wherein the second request message includes the hash value in step 910.

Systems and methods for processing data according to exemplary embodiments of the present invention can be performed by one or more processors executing sequences of instructions contained in a memory device. Such instructions may be read into the memory device from other computer-readable mediums such as secondary data storage device(s).

Execution of the sequences of instructions contained in the memory device causes the processor to operate, for example, as described above. In alternative embodiments, hard-wire circuitry may be used in place of or in combination with software instructions to implement the present invention.

The above-described exemplary embodiments are intended to be illustrative in all respects, rather than restrictive, of the present invention. Thus the present invention is capable of many variations in detailed implementation that can be derived from the description contained herein by a person skilled in the art. All such variations and modifications are considered to be within the scope and spirit of the present invention as defined by the following claims. No element, act, or instruction used in the description of the present class should be construed as critical or essential to the invention unless explicitly described as such. Also, as used herein, the article "a" is intended to include one or more items.

What is claimed is:

1. A method for a first communication device to access an application class which is available on a second communication comprising:
    transmitting by said first communication device a request message, wherein said request message includes a request for said application class;
    receiving by said first communication device an acknowledgement message, wherein said acknowledgement message includes a hash value associated with said application class;
    storing by said first communication device said hash value associated with said application class;
    terminating said application class on said first communication device; and
    transmitting by said first communication device a second request message, wherein said second request message includes said hash value.

2. The method of claim 1, wherein said request message is a session initiation protocol (SIP) message and said acknowledgement message is a 200 OK message.

3. The method of claim 2, wherein said 200 OK message includes a content-type header field with a parameter, wherein said parameter includes said hash value.

4. The method of claim 1, wherein said application class has public and private sections.

5. The method of claim 4, wherein said application class is associated with a specific application.

6. The method of claim 5, wherein said specific application is chess.

7. The method of claim 1, wherein said first and second communications devices are mobile phones.

8. A method for handling an access request to an application class in a communication device comprising:
    receiving a first request message, wherein said request message includes a request for access to said application class;
    determining, dispatching instructions indicating how to route said request for said application class to said application class;
    creating a hash value associated with said application class;
    transmitting an acknowledgement message, wherein said acknowledgment message includes said hash value associated with said application class;
    receiving a second request message, wherein said second request message includes said hash value; and
    using said dispatching instructions associated with said hash value for said application class.

9. The method of claim 8, wherein said request message is a session initiation protocol (SIP) message and said acknowledgement message is a 200 OK message.

10. The method of claim 9, wherein said 200 OK message includes a content-type header field with a parameter, wherein said parameter includes said hash value.

11. The method of claim 8, wherein said step of creating a hash value associated with said application class further comprises:
    using a hash algorithm, wherein said hash algorithm uses said application class private name to create said hash value.

12. The method of claim 11, wherein said hash algorithm also uses at least one of session initiation protocol dialog information and class layer security information to create said hash value.

13. The method of claim 8, wherein said application class has public and private sections.

14. The method of claim 13, wherein said application class is associated with a specific application.

15. The method of claim 14, wherein said specific application is chess.

16. The method of claim 8, further comprising:
    creating dispatching instructions by an application dispatching manager for an application dispatcher.

17. The method of claim 8, wherein said step of determining, dispatching instructions indicating how to route said request for said application class to said application class further comprises:
    communicating with an external entity for assistance in determining what application class to use for said request.

18. The method of claim 8, further comprising:
    denying said request, unless said request includes a valid security token.

19. The method of claim 8, further comprising:
    storing said hash value associated with said application class and said dispatching instructions.

20. A communication device comprising:
    a communications interface for receiving a first request message and transmitting an acknowledgement message, wherein said first request message includes a request for access to an application class;
    a processor for dispatching instructions indicating how to route said request for access to said application class and wherein said processor creates a hash value associated with said application class; and
    memory for storing said hash value associated with said application class.

21. The communication device of claim 20, wherein said communications interface receives a second request message, wherein said second request message includes said hash value.

22. The communication device of claim 20, further comprising:
    an application dispatcher which routes said second request message to an application class based upon said hash value.

23. A non-transitory computer readable medium containing instructions, when executed on a processor, perform the steps of:
    transmitting by said first communication device a request message, wherein said request message includes a request for said application class;

receiving by said first communication device an acknowledgement message, wherein said acknowledgement message includes a hash value associated with said application class;

storing by said first communication device said hash value associated with said application class;

terminating said application class on said first communication device; and transmitting by said first communication device a second request message, wherein said second request message includes said hash value.

24. A non-transitory computer readable medium containing instructions, when executed on a processor, perform the steps of:

receiving a first request message, wherein said request message includes a request for access to said application class;

determining, dispatching instructions indicating how to route said request for said application class to said application class;

creating a hash value associated with said application class;

transmitting an acknowledgement message, wherein said acknowledgment message includes said hash value associated with said application class;

receiving a second request message, wherein said second request message includes said hash value; and using said dispatching instructions associated with said hash value for said application class.

* * * * *

UNITED STATES PATENT AND TRADEMARK OFFICE
CERTIFICATE OF CORRECTION

| | | |
|---|---|---|
| PATENT NO. | : 7,899,058 B2 | Page 1 of 1 |
| APPLICATION NO. | : 12/046559 | |
| DATED | : March 1, 2011 | |
| INVENTOR(S) | : Fersman et al. | |

It is certified that error appears in the above-identified patent and that said Letters Patent is hereby corrected as shown below:

On the Face Page, in Field (75), under "Inventors", in Column 1, Line 3, delete "Murargalan" and insert -- Murargatan --, therefor.

In Column 6, Line 64, delete "parameter." and insert -- parameter --, therefor.

Signed and Sealed this
Nineteenth Day of July, 2011

David J. Kappos
*Director of the United States Patent and Trademark Office*